(No Model.) 2 Sheets—Sheet 2.

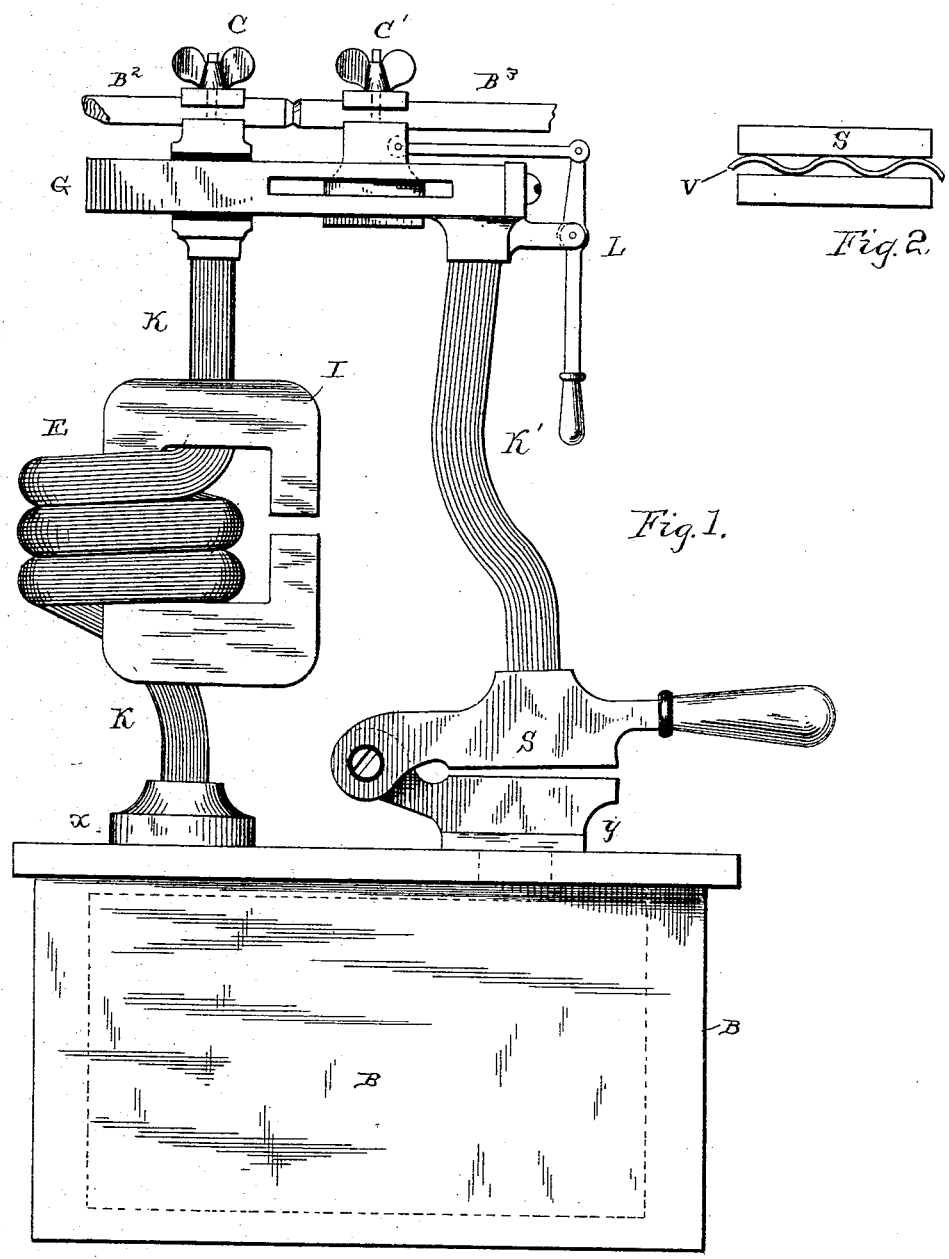

E. THOMSON.
PORTABLE ELECTRIC WELDING APPARATUS.

No. 394,892. Patented Dec. 18, 1888.

WITNESSES:
Ira R. Steward
Hm N Capel

INVENTOR:
Elihu Thomson.
BY
Townsend MacArthur
ATTORNEY,

N. PETERS, Photo-Lithographer, Washington, D. C.

UNITED STATES PATENT OFFICE.

ELIHU THOMSON, OF LYNN, MASSACHUSETTS.

PORTABLE ELECTRIC-WELDING APPARATUS.

SPECIFICATION forming part of Letters Patent No. 394,892, dated December 18, 1888.

Application filed August 16, 1888. Serial No. 282,890. (No model.)

*To all whom it may concern:*

Be it known that I, ELIHU THOMSON, a citizen of the United States, and a resident of Lynn, in the county of Essex and State of Massachusetts, have invented a certain new and useful Electric-Welding Apparatus, of which the following is a specification.

My invention relates to apparatus for welding or performing similar operations by the agency of an electric current of large volume passed through the work in sufficient amount to heat the same to the temperature required for the welding, forging, upsetting, or other operation.

The general object of my invention is to provide an apparatus portable in character and suited for the operations mentioned; but is more especially to provide a portable apparatus which may be used in welding sections of lead pipe or iron together, forming joints between wires and similar operations under conditions where the joint or weld must be made with the objects in the place which they will permanently occupy.

My apparatus is specially useful for plumbing-work or for electric-wiring operations.

My apparatus comprises an electric battery—such, for instance, as a storage-battery having plates of large surface and constructed to have a low internal resistance—such battery being suitably inclosed in a box or casing for portability. Heavy cables of proper flexibility connect the battery with the clamps or holders for the work, which may be applied to the object irrespective of the position of the battery. An electric switch of massive construction is placed in the connections.

The apparatus also contains special features of construction adapted to the work required, and to be presently more particularly described.

Figure 3:
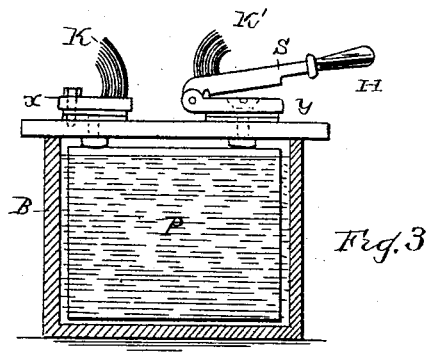
Figure 4:
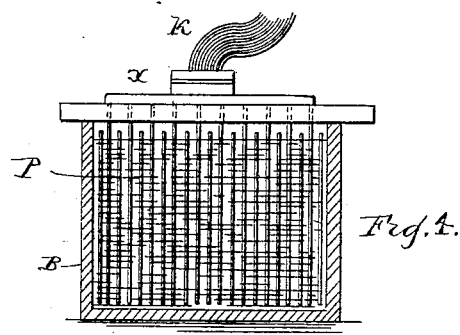
Figure 5:
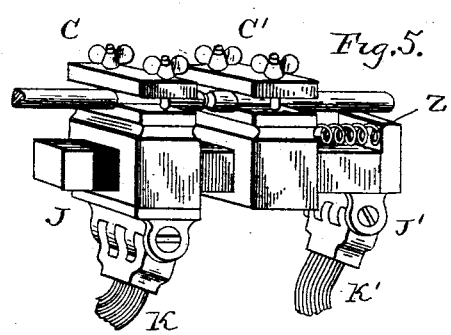
Figure 6:
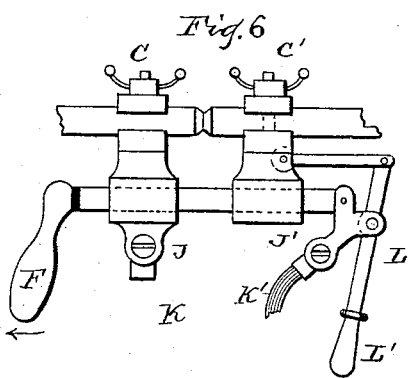
Figure 7:
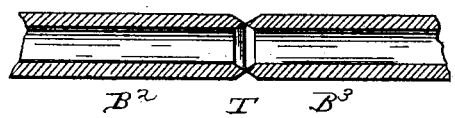
Figure 8:
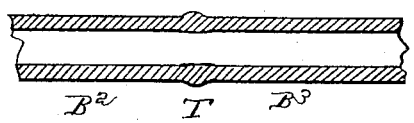

In the accompanying drawings, Figure 1 is a side elevation of an apparatus constructed in accordance with my invention. Fig. 2 shows a detail of construction. Fig. 3 is a cross-section through the battery. Fig. 4 is a cross-section on a line at right angles to that of Fig. 3. Fig. 5 shows in perspective a modification in the clamping or holding devices. Fig. 6 shows a further modification. Figs. 7 and 8 show an example of work performed by the apparatus.

B indicates a box or casing holding the plates of the battery and the suitable liquid. In the case of a storage-battery the plates may be of corrugated lead, or may be plain lead sheets immersed in dilute sulphuric acid and formed by the Planté process. The several plates are indicated by the letter P. This part of the apparatus is constructed so as to contain electrical energy sufficient to perform a number of welds or other similar operations without recharging the battery.

A primary battery, if large enough and of low enough resistance, might replace the storage-battery shown. I prefer, however, a storage-cell which may be charged by simple attachment to an arc-light line, and may be kept in place for a number of hours, depending upon its capacity and the size of the pieces to be welded. It might obviously also be placed in series with a number of incandescent lamps fed from continuous-current mains and requiring, as the battery does, very low voltage to charge it. The battery might also be charged by a special dynamo-machine—such, for instance, as a plating-dynamo—when available.

The terminals of the battery (indicated at $x$ $y$) are of any suitable form and are secured or connected to the battery-elements in any desired or proper manner known to electricians. All positive plates should have the common terminal, as $x$, and all negative plates should be connected to the other terminal, $y$.

The work-holding clamps (indicated at C C', respectively) are mounted upon a suitable guide-block or bed-plate, G. One of the clamps—as, for instance, C—is suitably insulated from the bed-plate G, while the other is adapted to slide upon said block, and is provided with a lever, L, which can be used as a pressure-lever to move the section of pipe or other object in the clamp C against the pipe or section or object in the clamp C'. In the instance shown, two sections of lead pipe, $B^2$ $B^3$, are supposed to be clamped and abutted for union by the electric-welding process. The clamp C is connected by a heavy cable, K, with the terminal $x$ of the battery, and the clamp C' is connected by a similar cable, K', to the other terminal, $y$, through an electric switch, S. The anvil for the switch S is mounted directly upon the terminal $y$, and the switch-lever itself is joined or hinged to the anvil, as indicated, by an insulating-joint made by interposing a suitable washer or washers of insulating material between the two parts jointed together at the point of hinging or jointing. The flexible cable K' is connected to the body of the switch-lever S, as indicated. I prefer to make the contact-surfaces of the switch in the form indicated more clearly in Fig. 2, where I have shown the surface-contact as consisting of a spring-plate, V, of corrugated, wavy, or irregular outline, interposed between the anvil and the switch-lever. This construction of switch-contact serves the purpose of a variable resistance under control of the operator, by means of which, through the application of variable pressure applied by the switch-handle, he may in a measure graduate the current, as required in the welding or other operation.

In operating the apparatus the clamps C C' are clamped to the sections of pipe or other metal piece, and the latter are abutted by means of the handle L, so as to be in contact with one another under a moderate pressure. The switch S is now closed to put on the current, which, passing across the joint, softens the metal, and the weld is completed through the pressure applied by the handle L bringing the two sections into union as they soften under the heat. The switch S is then opened to cut off the current. In order to check the rush of current at the start when the switch is closed and render the heating of the piece or pieces between the clamps C C' more gradual and under better control, I propose to construct the part of the conducting path between the clamp or clamps and the source in such way that it shall have an electric reaction. This, as is well understood in the electric art, may be accomplished by bringing parts of the circuit into parallellism with one another. In the present case I propose for this purpose to give one of the cables, K, a few turns upon itself, as indicated at E. These turns or coils may surround a massive iron core, I, of laminated or subdivided iron, to increase the self-induction of the portion of the circuit E.

It will be understood that the cables K K' should be of large section and high conductivity in order to carry the current without much loss.

In the form of clamp or holder illustrated in Fig. 5 a spring, Z, is employed to give pressure to the clamp C' in place of the lever L. The cables are here shown, also, as connected to the clamps through joints or hinges J J'. This gives greater facility in the application of the clamps to the work where it is not easily accessible.

In Fig. 6 I have shown an additional handle, F, applied to the block upon which the clamps are mounted and in position opposite the pressure-lever L. The handle F enables the operator to hold the clamp guide or block while the lever L is moved by pressure applied in effecting a joint between the pieces in the clamps.

Fig. 7 simply shows in section two pieces of lead pipe, $B^2$ $B^3$, with their abutting ends tapered preparatory to the welding operation. The tapering is done for the purpose of reducing the size of the bulge at the welded joint, and also for the purpose of increasing the preliminary heating effects of the current through the increased resistance at the tapered ends of the pipe.

Fig. 8 shows the joint complete.

What I claim as my invention is—

1. A portable electric-welding or other metal-working apparatus, consisting of a charged battery-cell of large current capacity, suitable clamps or holders, one or both movable, connections from the same to the terminals of the battery, and an electric switch in one of said connections.

2. A portable apparatus for electric welding and similar operations, comprising a charged cell whose plates are connected in multiple flexible cables or conductors connecting with the terminals of the cells, and with suitable clamps or holders, one or both movable, and an electric switch in the cable-connections.

3. A portable apparatus for electric welding and similar operations, comprising a charged battery-cell, a pair of clamps or holders, a flexible cable connecting said clamps with the battery, and an electric switch, to the lever of which a cable is attached while its anvil forms a terminal of the battery.

4. In an apparatus for electric welding, a guide bar or block carrying clamps or holders, one or both of which are adapted to slide upon said bar, in combination with the flexible cables connecting the same with the source of electric energy, whereby the clamps and blocks may be turned into different positions, as required, independently of the source.

5. The electric switch having an irregular or corrugated spring-contact surface bearing on its anvil at two or more separated points simultaneously, as and for the purpose described.

6. The combination, with the clamp structure for holding the work to be heated, of the electric-conducting cables hinged or jointed thereto, as and for the purpose described.

7. In an electric metal-working apparatus in which the work is heated by the electric resistance of the work to the passage through it of a current of large volume, a reactive electric conductor between the work and the source of heating electric current for the purpose of checking the rush of heating-current at the beginning of the operation and rendering the heating more gradual.

8. The combination, substantially as described, in an apparatus in which the work is heated by its resistance to the passage through it of an electric current of large volume, of a continuous current source, and a reactive conductor between said source and the clamps or abutments for holding the work, whereby the heating at the beginning of the operation may be rendered more gradual.

9. In an apparatus in which the heating effect of an electric current resisted in its passage through an electric conductor is employed, a continuous current source in combination with an electro-magnet whose conductor forms a part of the electric conductor connecting said source with a work-holding clamp or abutment, whereby the rush of heating-current at the beginning may be checked, as and for the purpose described.

10. The combination, with the clamps or holders mounted on a suitable guide-block and flexibly connected to the source, of a pressure-lever applied to a movable clamp, and a handle corresponding to said lever at the opposite side of the apparatus.

Signed at Lynn, in the county of Essex and State of Massachusetts, this 13th day of August, A. D. 1888.

ELIHU THOMSON.

Witnesses:
J. W. GIBBONEY,
A. L. ROHRER.